(12) United States Patent
Penner et al.

(10) Patent No.: US 8,556,037 B2
(45) Date of Patent: Oct. 15, 2013

(54) LUBRICATING NIPPLE

(75) Inventors: Alexander Penner, Neunkirchen-Seelscheid (DE); Uwe Schäfer, Hennef (DE)

(73) Assignee: GKN Walterscheid GmbH, Lohmar (DE)

( * ) Notice: Subject to any disclaimer, the term of this patent is extended or adjusted under 35 U.S.C. 154(b) by 129 days.

(21) Appl. No.: 12/869,929

(22) Filed: Aug. 27, 2010

(65) Prior Publication Data
US 2011/0048855 A1    Mar. 3, 2011

(30) Foreign Application Priority Data
Aug. 28, 2009 (DE) .................. 10 2009 039 002

(51) Int. Cl.
*F16C 1/24* (2006.01)
*F16N 21/02* (2006.01)

(52) U.S. Cl.
USPC .......................................................... 184/5.1

(58) Field of Classification Search
USPC ........................................ 184/5.1, 105, 105.3
See application file for complete search history.

(56) References Cited

U.S. PATENT DOCUMENTS

| | | | |
|---|---|---|---|
| 1,619,455 A * | 3/1927 | Zerk | 184/105.3 |
| 1,928,841 A * | 10/1933 | Morse | 285/148.2 |
| 1,946,063 A | 2/1934 | Dodge | |
| 2,250,123 A * | 7/1941 | Boehm | 184/105.3 |
| 2,439,053 A | 4/1948 | Moore | |
| 3,149,697 A * | 9/1964 | Bendeich et al. | 184/109 |
| 3,542,155 A | 11/1970 | Kern | |
| 3,568,800 A * | 3/1971 | Fisher | 184/105.3 |
| 5,906,047 A * | 5/1999 | Miller et al. | 29/890.132 |
| 6,244,295 B1 | 6/2001 | Bartussek et al. | |

FOREIGN PATENT DOCUMENTS

| | | |
|---|---|---|
| DE | 909880 | 4/1954 |
| DE | 1048448 | 1/1959 |
| DE | 1963208 | 7/1971 |

* cited by examiner

*Primary Examiner* — William E Dondero
*Assistant Examiner* — Mark K Buse
(74) *Attorney, Agent, or Firm* — Harness, Dickey & Pierce, P.L.C.

(57) ABSTRACT

A lubricating nipple (1) to be pressed into a bore (5) of a bearing bush (7) of a universal joint has a housing with a flow-through channel (22) to receive a lubricant. A check valve (25, 26, 27) is arranged in the through-flow channel (22). A seat portion (3) positions the lubricating nipple (1) in the bore (5) in the mounted condition. A coupling portion (2) couples the lubricating nipple (1) to a lubricating device. The coupling portion (2) has a first abutment face (10) that faces the seat portion (3). The mounted lubricating nipple (1), in the pressing-in direction, is axially supported by the first abutment face (10) against the thin-walled component (7). A collar portion (4) has a second abutment face (12). The second abutment face (12) is arranged opposite to the first abutment face (10). The mounted lubricant nipple (1) can be axially supported by the second abutment face (12) against the thin-walled component (7).

16 Claims, 2 Drawing Sheets

LUBRICATING NIPPLE

CROSS-REFERENCE TO RELATED APPLICATION

This application claims priority to German Patent Application No. 102009039002.2-26 filed Aug. 28, 2009, which application is herein expressly incorporated by reference.

FIELD

The disclosure relates to a lubricating nipple pressed into a bore of a thin-walled component, more particularly, of a bearing bush of a universal joint.

BACKGROUND

Lubricating nipples are available in different embodiments. Lubricating nipples frequently include a thread that is threaded into a threaded bore or turned into a bore without a thread in a self-cutting way. For cost-cutting purposes, lubrication nipples are frequently pressed or beaten into the bores and positioned in the bore via a press-fit. Such pressed lubricating nipples are known from EP 0 450 845 B1. Here, a multi-head lubricating nipple assembly is provided with a plurality of lubricating nipples. Each lubricating nipple is pressed into a corresponding bore of a basic member. U.S. Pat. No. 2,250,123 also shows lubricating nipples that are pressed into bores wherein, inter alia, there is shown a press fit in a bore of a thin-walled component.

The lubricating nipples that are pressed in or beaten in the bores are disadvantageous in that the holding forces of the lubricating nipples depend entirely on the fitting conditions of the press fit. Thus, relatively low extraction forces, such as centrifugal forces or vibrations of the lubricating nipple, are sufficient to remove the lubricating nipple from the bore arranged in the base of the bearing bushes of a universal joint.

In the case where high forces are generated, such as in universal joints as a result of centrifugal forces, there is a need for particularly high holding forces. This requires high pressing-in forces during assembly. In addition, because of the thin walls of the bearing bushes of the universal joints, it is difficult to achieve a sufficiently high production accuracy that ensures sufficiently small deviations of the holding force after assembly.

SUMMARY

It is an object of the present disclosure to propose a lubricating nipple that can be cost-effectively mounted and ensures a firm hold, more particularly, in thin-walled components.

In accordance with the disclosure, a lubricating nipple to be pressed into a bore of a thin-walled component, more particularly, a bearing bush of a universal joint, comprises a housing with a through-flow channel for a lubricant. A check valve is arranged in the through-flow channel. A seat portion positions the lubricating nipple in the bore in a mounted condition. A coupling portion couples the lubricating nipple to a lubricating device. The coupling portion includes a first abutment face and a collar portion. The first abutment face faces the seat portion. The mounted lubricating nipple, in the pressing-in direction, can be axially supported by the first abutment face against the thin-walled component. The collar portion includes a second abutment face that is arranged opposite to the first abutment face. The mounted lubricant nipple can be axially supported by the second abutment face against the thin-walled component.

Thus, it is ensured that the lubricating nipple arranged in the bore is able to support itself, via the second abutment face of the collar portion, against the pressing-in direction and is securely held in the bore. A kind of barb is achieved that ensures that the lubricating nipple is held in the bore in a form-locking way. The secure fit of the lubricating nipple in the bore is thus not entirely dependent on the press-fit of the lubricating nipple in the bore. Accordingly, it is possible to ensure easily reproducible holding forces. For mounting purposes, the collar portion is first pressed through the bore of the thin-walled component. The greatest outer diameter of the collar portion is dimensioned in such a way that both the collar portion and the thin-walled component are only elastically deformed. As soon as the lubricating nipple has been deeply pressed into the bore, the collar portion leaves the bore and, by the second abutment face, positions itself behind the thin-walled component. The thin-walled component and the collar portion elastically return, by deformation, to their original position offering secure form-locking holding conditions. The seat portion can be dimensioned in such a way that it is positioned, via a press-fit, in the bore. For this purpose, the seat portion has a cylindrical shape.

In a preferred embodiment, both abutment faces have circular shapes. The collar portion, at the outer circumference of the second abutment face, can be provided with a sharp edge. Thus, when an attempt is made to extract the lubricating nipple out of the bore, the sharp edge cuts into the thin-walled component or rather into the bore of the thin-walled component ensuring an additional hold.

Starting from the second abutment face, the collar portion changes into a cylindrical portion. To facilitate the process of pressing the lubricating nipple into the bore, the cylindrical portion, in a region facing away from the second abutment face, includes a taper that extends towards the end of the lubricating nipple. Preferably, it is provided in the form of a chamfer. The chamfer can include two different gradients. At the end of the lubricating nipple, a greater gradient is provided than in the transition to the cylindrical portion. The taper is provided in the form of a chamfer with a first chamfer portion and a second chamfer portion. Both chamfer portions have the shape of a truncated cone. The cone angle of the first chamfer portion is smaller than the cone angle of the second chamfer portion.

Alternatively, the collar portion includes a saw-tooth-shaped tooth that forms the second abutment face. It is thus possible, at the outer circumference of the second abutment face, to provide an even sharper edge that forms a kind of cutting edge. Further, a plurality of saw-tooth-shaped teeth, forming a plurality of cutting edges, may cut into the thin-walled component if an attempt is made to extract the lubricating nipple out of the bore.

The coupling portion has a collar that includes the first abutment face. The collar has a circular-cylindrical outer circumferential face or it can be designed in such a way that it can be gripped by tools.

Furthermore, the object of the disclosure is achieved by providing a bearing bush that contains the lubricating nipple. The bearing bush includes a base with a centrally arranged bore. The bearing bush is preferably produced out of sheet metal.

Further areas of applicability will become apparent from the description provided herein. The description and specific examples in this summary are intended for purposes of illustration only and are not intended to limit the scope of the present disclosure.

DRAWINGS

Preferred embodiments will be explained in greater detail below with reference to the drawings wherein.

DETAILED DESCRIPTION

Figure 1:
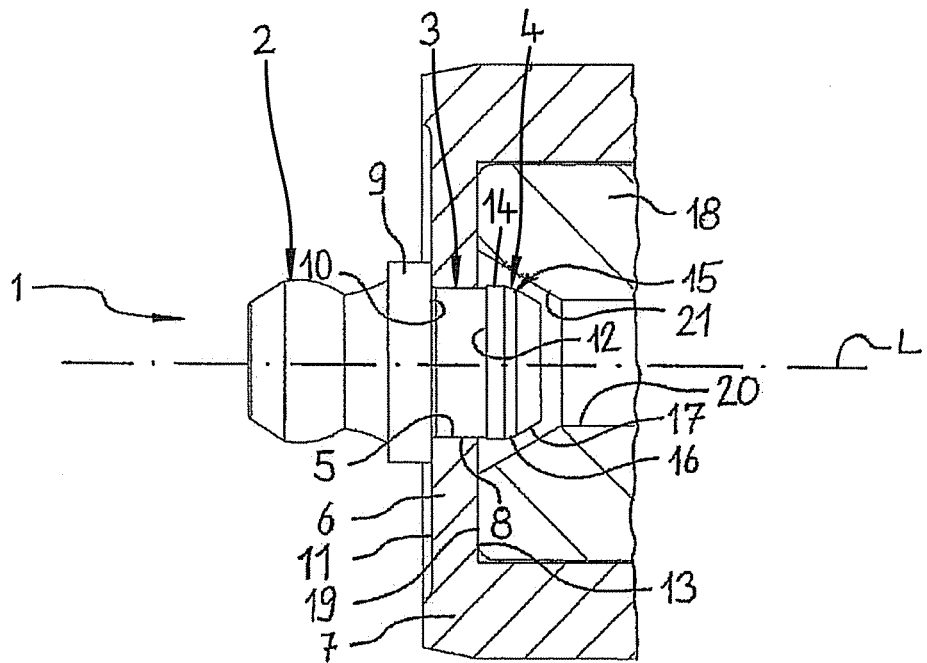
FIG. 1 is a partial longitudinal section view through a bearing bush with a first embodiment of a lubricating nipple.

FIG. 1 illustrates a first embodiment of a lubricating nipple 1. The lubricating nipple 1 includes a coupling portion 2 coupled with a lubricating device such as a grease press. The coupling portion 2 adjoins a seat portion 3 via which the lubricating nipple 1 is arranged in a bore 5. The seat portion 3 is followed by a collar portion 4. The lubricating nipple 1 is positioned in the bore 5 of a base 6 of a bearing bush 7. An arm 18 of a universal joint is rotatably supported in the bearing bush 7.

The seat portion 3 includes a cylindrical outer circumferential face 8. The circumferential face 8 outer diameter is designed in such a way that the outer circumferential face 8 is positioned, via a press fit, in the bore 5. The circumferential face 8 alone provides support for the lubricating nipple 1 in the bearing bush 7. The coupling portion 2 includes a collar 9 that faces the base 6. The collar 9 extends around a longitudinal axis L. The collar 9 is formed with a first abutment face 10. The lubricating nipple 1 is axially supported by the first abutment face 10 against an outer face 11 of the base 6 in the pressing-in direction, which in the illustration according to FIG. 1 extends towards the right. The first abutment face 10 has a circular shape and is arranged on an imaginary plane that extends perpendicularly relative to the longitudinal axis L.

The collar portion 4 forms a second abutment face 12. The second abutment face 12 is arranged opposite to the first abutment face 10. The second abutment face 12 also has a circular shape and is arranged parallel to the first abutment face 10. The second abutment face 12 is supported against an inner face 13 of the bearing bush 7 that faces away from the outer circumferential face 8. The second abutment face provides support axially in the direction of the longitudinal axis L and against the pressing-in direction. In the condition of the lubricating nipple as illustrated, a gap is provided between the inner face 13 and the second abutment face 12 in order to ensure a safe assembly when pressing the collar portion 4 through the bore 5. If, however, a force is generated against the pressing-in direction, the lubricating nipple 1 can be pressed out of the bore 5 to such an extent that the second abutment face 12 comes to rest against the inner face 13.

The second abutment face 12 is adjoined by a cylindrical portion 14 of the collar portion 4. The cylindrical portion 14 faces away from the seat portion 3 and changes into a chamfer 15. The chamfer 15 is divided into a first chamfer portion 16, that directly adjoins the cylindrical portion 14, and a second chamfer portion 17, that adjoins the first chamfer portion 16 towards the end of the lubricating nipple 1. The purpose of the chamfer 15 is, prior to the lubricating nipple being built in, to introduce the lubricating nipple initially only partially, into the bore 5. The nipple 1 is then pressed or beat into the bush 7. The lubricating nipple 1 remains centered relative to the longitudinal axis L. The second chamfer portion 17 enables the lubricating nipple to be pre-centered. The first chamfer portion 16 serves as a threading-in inclination during the pressing-in process. For this purpose, both chamfer portions 16, 17 are in the shape of a truncated cone. The cone angle of the first chamfer portion 16 is smaller than the cone angle of the second chamfer portion 17.

A sharp edge 32 is formed in the transition region between the second abutment face 12 and the cylindrical portion 14. If force is applied to the lubricating nipple against the pressing-in direction, the sharp edge 32 cuts into the bore 5 and thus provides additional support.

The cylindrical portion 14 of the collar portion 4 is dimensioned in such a way that, when the lubricating nipple is pressed into the bore 5, the collar portion 4 and the bore 5 with its base 6 are only elastically deformed. Thus, after the collar portion 4 has been pressed into the bore 5, both the collar portion 4 and the bore 5 are deformed back into their original shape. Plastic deformation has to be avoided at this point. In this way, it is always ensured that the collar portion 4 is positioned securely behind the bore 5 of the base 6. This ensures that the lubricating nipple 1 is held in a form-locking way.

As already mentioned above, the arm 18 is rotatably supported in the bearing bush 7. The arm 18 includes a lubricating bore 20 that extends coaxially relative to the longitudinal axis L. The bore 20, at the free end 19 of the arm 18, changes into an inclined indentation 21 that widens towards the free end 19. The free end 19 is supported against the inner face 13 of the base 6. In the mounted condition, the collar portion 4 is located inside the inclined indentation 21 of the arm 18. The lubricant is guided through the lubricating nipple 1 directly into the lubricating bore 20 of the arm 18 from where the lubricant is guided to the remaining arms.

Figure 2:
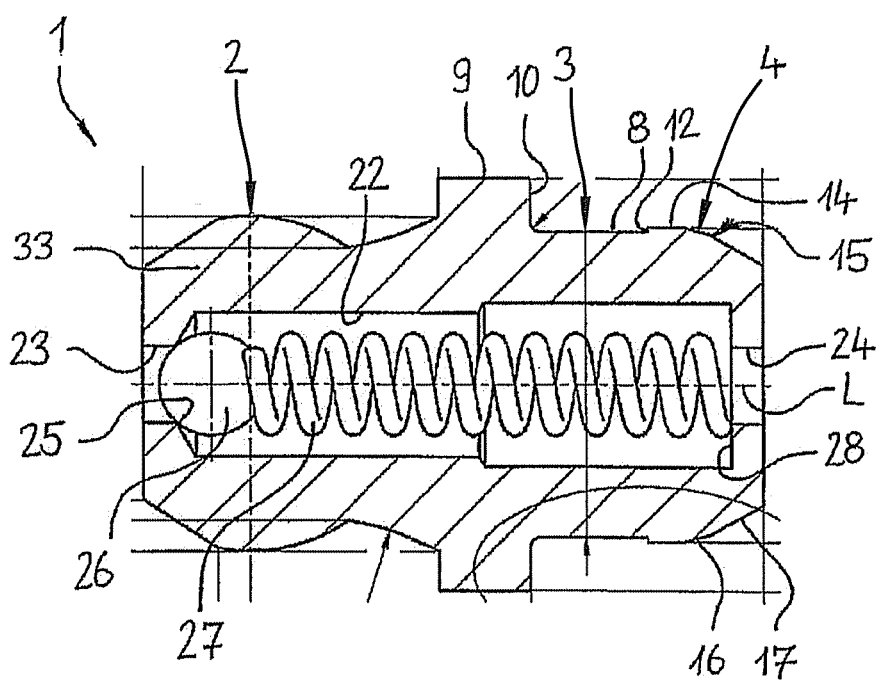
FIG. 2 is a longitudinal section view through the lubricating nipple according to FIG. 1.

FIG. 2 is a longitudinal section view through the lubricating nipple 1 according to FIG. 1. The lubricating nipple 1 includes a housing 33 that contains a flow-through channel 22. The flow-through channel 22 extends coaxially relative to the longitudinal axis L. The flow-through channel 22 has a tapered bore portion 23 at the coupling portion end and a tapered bore portion 24 at the collar portion end. In the transition region to the tapered bore portion 23 at the coupling portion 2, a continuous sealing edge 25 is formed. A ball 26 is supported against the sealing edge 25. The diameter of the ball 26 is greater than that of the tapered bore portion 23. A pressurized spring 27 holds the ball 26 in contact with the sealing edge 25. The pressurized spring 27 is supported against the ball 26 and against the supporting face 28 in the transition region of the bore portion 24 that is tapered towards the collar portion end. When a grease press is connected to the coupling portion 2, grease can be pressed, via the grease press, into the tapered bore portion 3. The ball 26 is lifted off the sealing edge 25 against the spring force of the pressurized spring 27 releasing the flow-through channel. The sealing edge 25, the ball 26 and the pressure spring 27 thus form parts of a check valve.

Figure 3:
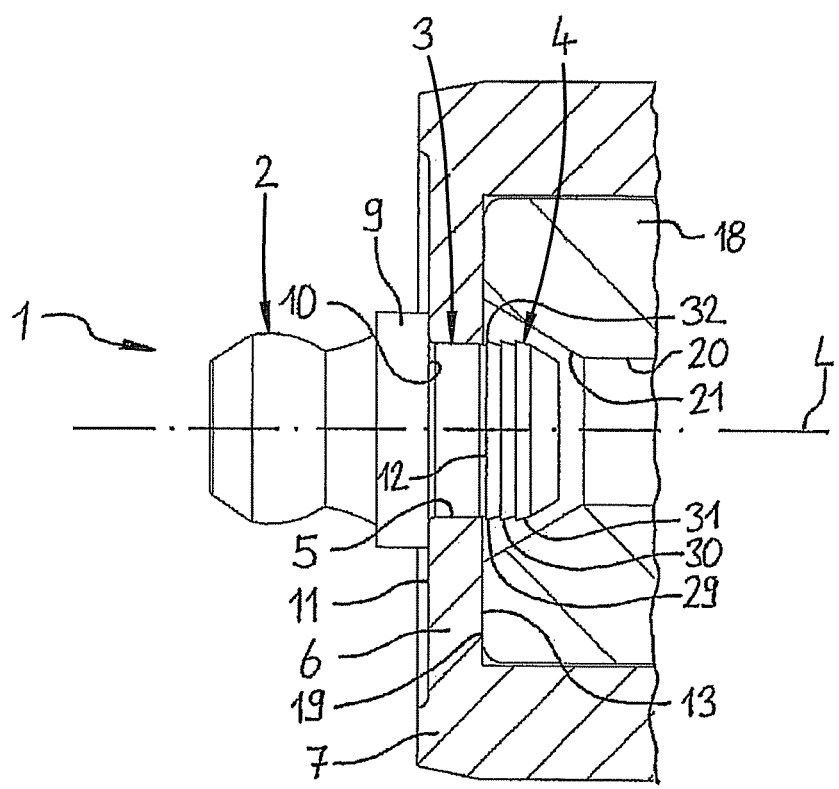
FIG. 3 is a partial longitudinal section view of a bearing bush with a second embodiment of a lubricating nipple.

FIG. 3 is the same view as FIG. 1 of a second embodiment of a lubricating nipple 1. Corresponding components having been given the same reference numbers.

The lubricating nipple 1 according to FIG. 3 differs from the lubricating nipple 1 according to FIG. 1 with respect to the embodiment of the collar portion 4. In FIG. 3, the collar portion 4 includes three continuous saw-tooth-shaped teeth 29, 30, 31. The first tooth 29 immediately adjoins the seat portion 3 and forms the second abutment face 12. As a result of the saw-tooth-shaped profile of the tooth 29 (if viewed in a longitudinal section), a sharper edge 32 is formed at the outer circumference of the second abutment face 12. The first tooth 29 is adjoined by a third tooth 31 that is also designed like the first tooth 29. The third tooth 31 forms the chamfer 15 with the two chamfer portions 16 and 17. The sharp edges 32 of the teeth 29, 30, 31 act like cutting edges and prevent any unintentional removal of the lubricating nipple 1 out of the bore 5.

The description of the disclosure is merely exemplary in nature and, thus, variations that do not depart from the gist of the disclosure are intended to be within the scope of the disclosure. Such variations are not to be regarded as a departure from the spirit and scope of the disclosure.

What is claimed is:

1. A lubricating nipple for being pressed into a bore of a thin-walled component, such as a bearing bush of a universal joint, comprising:
    a housing with a flow-through channel for enabling passage of a lubricant;
    a check valve arranged in the flow-through channel;
    a seat portion, the seat portion positioning the lubricating nipple in the bore in a mounted condition;
    a coupling portion for coupling the lubricating nipple to a lubricating device, the coupling portion includes a first abutment face, the first abutment face faces the seat portion, the mounted lubricating nipple, in the pressing-in direction, is axially supported by the first abutment face against an outside surface of the thin-walled component;
    a collar portion includes a second abutment face, the second abutment face is arranged opposite to the first abutment face, the collar portion expands the bore in the thin wall component as the collar passes through the thin wall, after passage of the collar portion, the collar portion has a diameter larger than a diameter of the bore in the thin wall component, the thin wall component elastically returns abutting against the seat portion and a gap is provided between the thin walled component and the second abutment face to ensure assembly of the lubricating nipple with the thin walled component and the mounted lubricant nipple can be axially supported by the second abutment face against an inside surface of the thin-walled component.

2. The lubricating nipple according to claim 1, wherein the seat portion is cylindrically shaped.

3. The lubricating nipple according to claim 1, wherein the diameter of the seat portion is dimensioned in such a way that the seat portion, in the mounted condition of the lubricating nipple, is positioned in the bore via a press fit in the bore.

4. The lubricating nipple according to claim 1, wherein the abutment faces are annularly shaped.

5. The lubricating nipple according to claim 1, wherein the collar portion on an outer circumference of the second abutment face includes a sharp edge.

6. The lubricating nipple according to claim 1, wherein from the second abutment face, the collar portion changes into a cylindrical portion.

7. The lubricating nipple according to claim 1, wherein at an end remote from the seat portion, the collar portion includes a taper, such as a chamfer extending towards the end.

8. The lubricating nipple according to claim 7, wherein the chamfer includes a first chamfer portion and a second chamfer portion, both chamfer portions are provided in the form of a truncated cone and a cone angle of the first chamfer portion is smaller than a cone angle of the second chamfer portion.

9. The lubricating nipple according to claim 1, wherein the collar portion includes at least one saw-tooth-shaped continuous tooth that forms the second abutment face.

10. The lubricating nipple according to claim 9, wherein the collar portion includes a plurality of saw-tooth-shaped continuous teeth, a tooth adjoining the seat portion forms the second abutment face.

11. The lubricating nipple according to claim 10, wherein the coupling portion forms a collar that includes the first abutment face.

12. The lubricating nipple according to claim 1, wherein the lubricating nipple is made of metal.

13. A bearing bush for a universal joint, wherein the bearing bush comprises a bore that receives the lubricating nipple according to claim 1.

14. The bearing bush according to claim 13, wherein the bearing bush includes a base with a centrally arranged bore.

15. The bearing bush according to claim 13, wherein the bearing bush is produced out of sheet metal.

16. A lubricating nipple for being pressed into a bore of a thin-walled component, such as a bearing bush of a universal joint, comprising:
    a housing with a flow-through channel for enabling passage of a lubricant;
    a check valve arranged in the flow-through channel;
    a seat portion, the seat portion positioning the lubricating nipple in the bore in a mounted condition;
    a coupling portion for coupling the lubricating nipple to a lubricating device, the coupling portion includes a first abutment face, the first abutment face faces the seat portion, the mounted lubricating nipple, in the pressing-in direction, is axially supported by the first abutment face against the thin-walled component;
    a collar portion includes a second abutment face, the second abutment face is arranged opposite to the first abutment face, the collar portion expands the bore in the thin wall component as the collar passes through the thin wall, after passage of the collar portion, the collar portion has a diameter larger than a diameter of the bore in the thin wall component, and the thin wall component elastically returns abutting against the seat portion and the mounted lubricant nipple can be axially supported by the second abutment face against an inside surface of the thin-walled component;
    a taper is on the collar portion at an end remote from the seat portion, the taper includes a chamfer extending towards the end; and
    the chamfer includes a first chamfer portion and a second chamfer portion, both chamfer portions are provided in the form of a truncated cone and a cone angle of the first chamfer portion is smaller than a cone angle of the second chamfer portion.

* * * * *

UNITED STATES PATENT AND TRADEMARK OFFICE
CERTIFICATE OF CORRECTION

PATENT NO. : 8,556,037 B2
APPLICATION NO. : 12/869929
DATED : October 15, 2013
INVENTOR(S) : Alexander Penner It is certified that error appears in the above-identified patent and that said Letters Patent is hereby corrected as shown below:

Title Page
Item [75] Inventors, Line 2

"Neunkirchen-Seelscheld (DE)" should be --Neunkirchen-Seelscheid (DE)--

Signed and Sealed this
Twenty-fifth Day of February, 2014

Michelle K. Lee
*Deputy Director of the United States Patent and Trademark Office*